United States Patent
Celada Yebenes

(10) Patent No.: US 9,475,428 B2
(45) Date of Patent: Oct. 25, 2016

(54) STEERING WHEEL ASSEMBLY, STEERING WHEEL AND METHOD OF ACTUATING A HORN

(71) Applicant: Dalphi Metal Espana S.A., Madrid (ES)

(72) Inventor: Manuel Angel Celada Yebenes, Vigo (ES)

(73) Assignee: Dalphi Metal Espana S.A. (ES)

( * ) Notice: Subject to any disclaimer, the term of this patent is extended or adjusted under 35 U.S.C. 154(b) by 0 days.

(21) Appl. No.: 14/656,793

(22) Filed: Mar. 13, 2015

(65) Prior Publication Data

US 2015/0258933 A1 Sep. 17, 2015

(30) Foreign Application Priority Data

Mar. 13, 2014 (DE) .................... 20 2014 002 193 U

(51) Int. Cl.
*B60Q 5/00* (2006.01)
*B60R 21/203* (2006.01)
*B62D 1/04* (2006.01)

(52) U.S. Cl.
CPC ........... *B60Q 5/003* (2013.01); *B60R 21/2037* (2013.01); *B62D 1/046* (2013.01)

(58) Field of Classification Search
CPC .. B60R 21/2037; B62D 1/046; B60Q 5/003; H01H 9/06; H01H 3/142; H01B 7/104
USPC ............ 200/61.54, 345, 61.27, 61.55–61.57, 200/61.88
See application file for complete search history.

(56) References Cited

U.S. PATENT DOCUMENTS

| | | | | |
|---|---|---|---|---|
| 5,350,190 A | * | 9/1994 | Szigethy | ............. B60R 21/2037 200/61.55 |
| 6,688,637 B2 | | 2/2004 | Igawa et al. | |
| 8,173,917 B2 | * | 5/2012 | Rosman | ................. B60K 20/06 200/61.88 |
| 2009/0014294 A1 | * | 1/2009 | Rosman | ................. F16H 59/02 200/61.88 |
| 2014/0203539 A1 | | 7/2014 | Bachmann et al. | |

FOREIGN PATENT DOCUMENTS

| | | |
|---|---|---|
| DE | 102012002722 | 3/2013 |
| WO | 2011/100960 | 8/2011 |

* cited by examiner

*Primary Examiner* — Edwin A. Leon
(74) *Attorney, Agent, or Firm* — Tarolli, Sundheim, Covell & Tummino LLP

(57) ABSTRACT

A steering wheel assembly including a support element having at least one click-stop element, and at least one guide bush for connection to an airbag module. The guide bush is connected to the click-stop element by a click-stop connection. The click-stop connection has play so that the guide bush is movable relative to the click-stop element in the vertical direction. The support element includes at least one first contact sheet and the guide bush includes at least one second contact sheet. The first contact sheet is arranged in its mounting position beneath the guide bush so that the second contact sheet is made to contact the first contact sheet by movement of the guide bush.

16 Claims, 3 Drawing Sheets

STEERING WHEEL ASSEMBLY, STEERING WHEEL AND METHOD OF ACTUATING A HORN

BACKGROUND OF THE INVENTION

The invention relates to a steering wheel assembly according to the preamble of claim 1. Such steering wheel assembly is known, for example, from DE 10 2012 002 722 A1.

DE 10 2012 002 722 A1 describes a bearing unit having, on the one hand, a steering wheel-side part and, on the ether hand, a module-side part which serve for connecting an airbag module to a steering wheel. The steering wheel-side part is coupled directly to the support element of the steering wheel assembly and is thus connected to the steering wheel. The module-side part and the steering wheel-side part are biased against each other so that the airbag module is arranged to be spaced apart from the support element in an idle position of the module-side part. The airbag module is movable against the biasing force toward the support element, wherein the module-side part and the steering wheel-side part of the bearing unit abut against each other. A horn contact is provided to be structurally separated from the bearing unit.

The known arrangement is complex in respect of the number of component parts that are required, apart from the mechanical retaining and guiding elements, so as to establish a horn contact between the airbag module and the support element.

SUMMARY OF THE INVENTION

It is the object of the invention to describe a steering wheel assembly having a simple structure. Furthermore it is the object of the invention to describe a steering wheel comprising such steering wheel assembly and a method of actuating the horn.

In accordance with the invention, this object is achieved with respect to the steering wheel assembly by the subject matter of claim 1, with respect to the steering wheel by the subject matter of claim 15 and with respect to the method of actuating a horn by the subject matter of claim 16.

The steering wheel assembly according to the invention includes a support element having at least one click-stop element. Furthermore the steering wheel assembly comprises at least one guide bush for connection to an airbag module. The guide bush is connected to the click-stop element by a click-stop connection. The click-stop connection has play so that the guide bush is movable relative to the click-stop element along the longitudinal axis of the guide bush from an idle position into a hooting position. The support element includes at least one first contact sheet. The guide bush includes at least one second contact sheet. The first contact sheet is associated with the click-stop element and is arranged in its mounting position beneath the guide bush so that the second contact sheet can be made to contact the first contact sheet by the longitudinal movement of the guide bush.

Hence, for actuating the horn the second contact sheet of the guide bush is temporarily connected to the first contact sheet arranged at the support element and in this way the horn contact is established. The click-stop element and the guide bush have a multiple function. On the one hand, in the finally assembled state they effectuate the mechanical guiding of the airbag module relative to the support element. On the other hand, the guide bush and the click-stop element together form the guiding for the horn contacts. For this, the second contact sheet is provided at the guide bush. Moreover, the first contact sheet is associated with the click-stop element and is arranged in its mounting position beneath the guide bush so that the second contact sheet can be made to contact the first contact sheet by the longitudinal movement of the guide bush. Thus additional components for fastening and guiding the second contact sheet are dispensed with so that a compact assembly requiring little space is provided.

In accordance with the invention, the mechanical guide of the airbag module relative to the support element is combined with the mechanical guide of the horn contacts in one single component group, i.e. in the group comprising, especially consisting of the guide bush and the click-stop element.

Advantageous further developments of the invention are described in the subclaims.

For stable fastening of the airbag module and safe mechanical guiding the steering wheel assembly can include three click-stop connections of this type each of which comprises a click-stop element and a guide bush having respective contact sheets arranged thereon.

In a preferred embodiment of the invention the second contact sheet is connected to an underside of the guide bush. By arranging the second contact sheet at the underside of the guide bush a simple and stable fixing of the second contact sheet is brought about. The second contact sheet is fixedly connected to the guide bush. The connection of the second contact sheet to the guide bush can be made, for example, by pins disposed at the guide bush. After arranging the second contact sheet said pins are melted on, for instance, and thus fix the sheet to the guide bush in a positive-locking manner. Another advantage of the underside arrangement of the second contact sheet consists in the fact that the distance between the idle position and the hooting position of the second contact sheet is reduced hereby.

In another preferred variant of the present invention, the shape of the second contact sheet is adapted to the shape of a lateral profile of the guide bush. In this way substantially the full surface of the second contact sheet can rest on the guide bush, thereby a stable support being obtained.

Furthermore, the guide bush can have at least one lateral retaining arm. In particular, the guide bush can have two lateral retaining arms. The two retaining arms can be arranged to be opposed, especially diametrically opposed. The lateral retaining arm serves for positioning the second contact sheet fastened thereto and making the latter to contact a desired area of the first contact sheet.

Preferably the second contact sheet has at least one recess. A lower bush portion of the guide bush passes through said recess. The recess of the second contact sheet can surround the lower bush portion of the guide bush at least partially, especially completely. By this recess the positioning of the second contact sheet is facilitated. The lower bush portion serves as guide element interacting with the click-stop element as guiding counterpart.

In another preferred embodiment of the steering wheel assembly according to the invention an upper bush portion of the guide bush is connected to the airbag module. Between the lower bush portion and the upper bush portion the second contact sheet is arranged. The connection between the airbag module and the guide bush can be configured in a way known per se. By arranging the second contact sheet between the upper and lower bush portions a sufficiently safe distance from the first contact sheet in the idle position is provided.

In a preferred embodiment of the invention the first contact sheet includes at least one arm having a contact portion, especially two arms. Each of the two arms of the first contact sheet has a contact portion and permits making safe contact with the second contact sheet. The click-stop element can be arranged between the arms of the first contact sheet. This arrangement is an example of associating the first contact sheet with the click-stop element. The two arms can be arranged in V-shape. The two arms of the first contact sheet are arranged on the support element so that substantially the full surface thereof rests on the support element.

Preferably the second contact sheet has at least two contact portions. The at least two contact portions of the second contact sheet correspond to the at least two contact portions of the first contact sheet and can be made to contact the same for hooting. In the idle position and in the hooting position the contact portions of the two contact sheets are arranged in parallel. Both contact portions of the first contact sheet contact both contact portions of the second contact sheet in the hooting position.

It is sufficient for triggering the hooting signal when a contact portion of the second contact sheet contacts the corresponding contact portion of the first contact sheet. It is achieved in this way that even when the guide bush is inclined, i.e. in the case of an irregular movement of the second contact sheet, the horn is safely actuated.

Furthermore, it may be provided that each of the two contact portions of the second contact sheet forms an extension extending downwards in the mounting position. When each of the two contact portions of the second contact sheet is arranged at said extension, the distance between the first and second contact sheets in the idle position and thus the distance to be covered by the second contact sheet to the hooting position is reduced. Thus the responsive behavior of the horn can be set.

In a preferred embodiment of the invention, the two contact portions of the first contact sheet are electrically connected by a connecting element. In order not to couple each individual contact portion of the first contact sheet to the electric circuit for triggering the horn signal it is advantageous when the two contact portions of the first contact sheet are electrically interconnected by a connecting element. Thus for the first contact sheet a single electric connection is sufficient for connection to the circuit.

In another preferred embodiment of the invention, each of the two contact portions of the first contact sheet and/or of the second contact sheet has at least one elevated contact point. The first contact sheet can be impressed in a foamed support element, for example, and can be positively fastened to the support element by fixing points. The fixing points can project from the surface of the first contact sheet. This is due to excessive material accumulating on the surface of the first contact sheet and forming a slight elevation vis-à-vis the contact surface of the first contact sheet at this point. In order to ensure the contact between the first and second contact sheets despite this material elevation the first and/or the second contact sheet has elevated contact points projecting above all other material elevations on the first contact sheet.

In a preferred embodiment the first contact sheet at least partially surrounds the click-stop element. In other words, the first contact sheet is arranged at least partially along the periphery of the click-stop element. It is not absolutely necessary in this context that the contact sheet corresponds to the peripheral shape of the click-stop element. The first contact sheet partially surrounds the click-stop element, when e.g. the contact sheet includes arms arranged in V shape, as explained above, between which the click-stop element is arranged.

Arranging the contact sheet around the click-stop element facilitates the positioning of the first contact sheet on the support element and saves constructed space in the steering wheel assembly.

In a further preferred embodiment of the steering wheel assembly according to the invention the click-step element has at least one stop tongue, especially two stop tongues. The stop tongue extends in its mounting position upwards relative to the support element. The stop tongue engages with the guide bush. By the stop tongue the guide bush is connected and retained to the click-stop element. The connection between the stop tongue and the guide bush has play in the longitudinal direction of the guide bush such that the guide bush is movable relative to the click-stop element in the longitudinal direction of the guide bush. The play between the stop tongue and the guide bush corresponds to the distance between the idle position and the hooting position. The same applies to the click-stop element having two stop tongues.

Consequently, the stop tongue has a double function. On the one hand, it constitutes a stop for the guide bush restricting the longitudinal movement of the guide bush from the hooting position into the idle position and fixing the airbag module in the idle position at the support element. On the other hand, the stop tongue allows for the guided movement of the airbag module from the idle position into the hooting position of the guide bush and vice versa.

Preferably, a reset spring is arranged in the guide bush which acts on the click-stop element, on the one hand, and on the guide bush, on the other band. After triggering the horn signal and lifting the pressure the reset spring exerts a resetting force on the guide bush which returns the latter into its idle position together with the airbag module. In order to save additional components inside the steering wheel assembly the reset spring is arranged in the guide bush.

The present invention also relates to a steering wheel comprising a steering wheel assembly as described above.

It is provided in a preferred embodiment that the airbag module is connected to at least one, especially three guide bushes which are connected to at least one, especially three click-stop elements fixed at the support element.

Within the scope of the invention, a method of actuating a horn is disclosed and claimed in which a force moving the guide bush from the idle position into the hooting position is applied to a steering wheel according to the invention, wherein the second contact sheet is made to contact the first contact sheet by the longitudinal movement of the guide bush. The method of actuating a horn excels by a facilitated actuation of the horn function, because the horn function is realized with a small number of components.

BRIEF DESCRIPTION OF THE DRAWING

Hereinafter the invention is explained in detail by way of an embodiment with reference to the enclosed schematic drawings, in which.

DESCRIPTION

Figure 1:
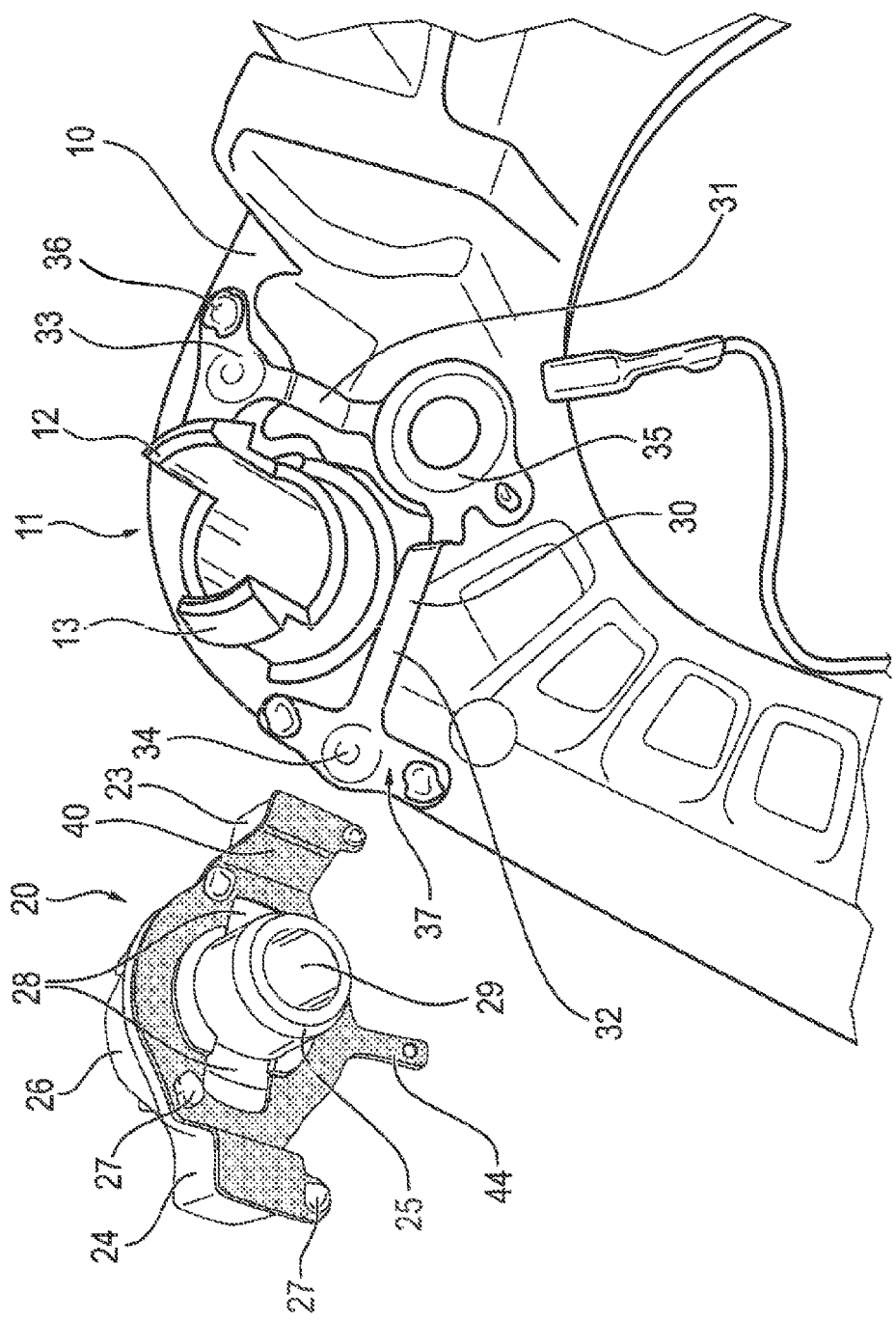
FIG. 1 shows a perspective view of a steering wheel assembly according to the invention in accordance with a preferred embodiment.

In FIG. 1 a steering wheel assembly is shown which is mounted in a steering wheel for an automotive vehicle. Within the scope of the invention both the steering wheel assembly as sub-unit of the steering wheel and the steering wheel comprising the steering wheel assembly are disclosed and claimed. All features of the steering wheel assembly are also disclosed in connection with the steering wheel.

The steering wheel assembly includes a support element 10. The support element 10 is foamed. A click-stop element 11 is connected to the supped element 10. The click-stop element 11 is impressed into the foam of the support element 10 during manufacture and is thus fixed to the support element 10.

Figure 2:
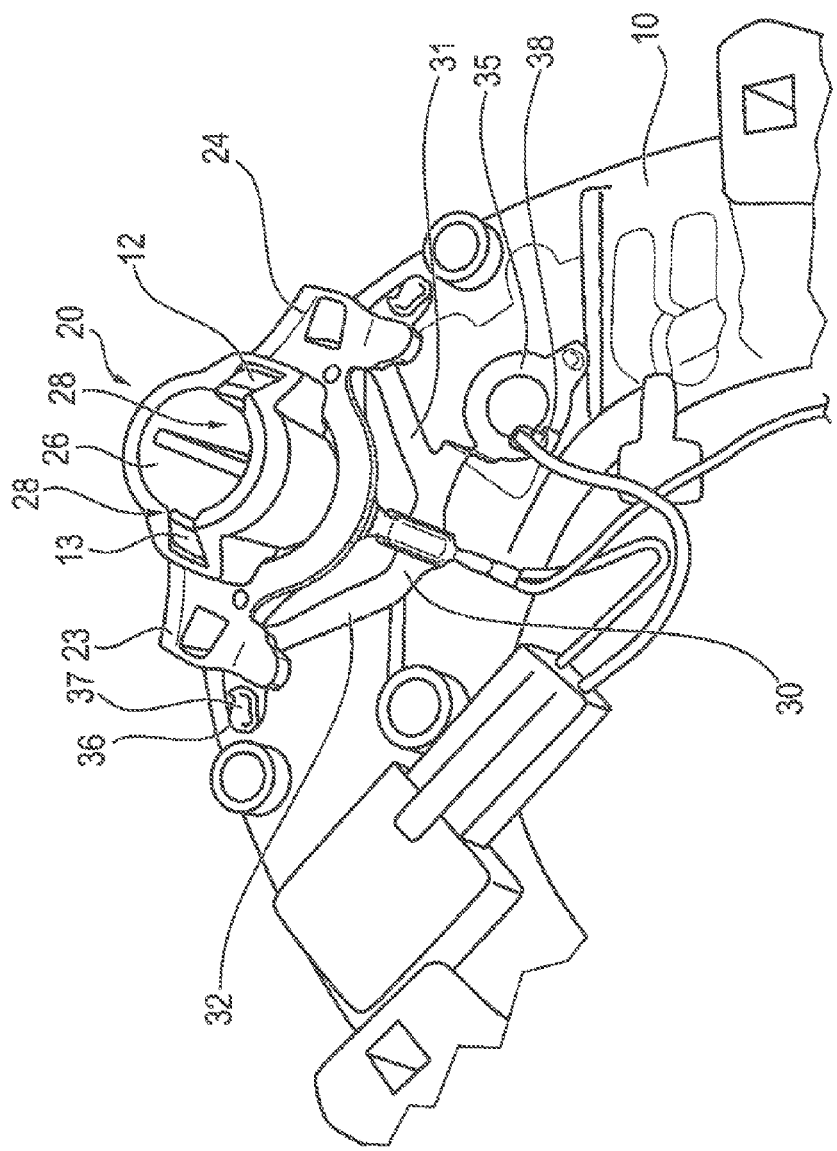
FIG. 2 shows a perspective view of the steering wheel assembly according to FIG. 1, wherein a guide bush is connected to a click-stop element.

In the illustrated embodiment the click-stop element 11 has a cylindrical shape. Other shapes are possible. Furthermore the steering wheel assembly includes a guide bush 20. The guide bush 20 is connected to an airbag module after final assembly of the steering wheel in a way known per se and not described in detail here. As is shown in FIG. 2, the guide bush 20 is connected to the click-stop element 11 by a click-stop connection. The click-step connection has play which is set so that the guide bush 20 is movable relative to the click-stop element 11 in the longitudinal direction of the guide bush 20.

For this purpose, the guide bush 20 is supported to be longitudinally movable in the click-stop element 11.

The support element 10 includes a first contact sheet 30. The guide bush 20 includes a second contact sheet 40. The first contact sheet 30 is arranged in its mounting position beneath the guide bush 20 at the support element 10. By movement of the guide bush 20 the second contact sheet 40 can be made to contact the first contact sheet 30.

Associating the first contact sheet 30 with the click-stop element 11 is resulting from the arrangement of the first contact sheet 30 beneath the guide bush 20 as well as from the guiding function of the guide bush 20 and of the click-stop element 11. In other words, the first contact sheet 30 is arranged in the motion path of the second contact sheet 40 which is defined by the position of the click-stop element 11. The first contact sheet 30 therefore is arranged closely to the click-stop element 11 and in so far is associated with the latter.

The second contact sheet 40 shown in FIGS. 1 to 4 is connected to the underside 21 of the guide bush 20. The second contact sheet 40 is adapted to the shape of the lateral profile 22 of the guide bush 20 (cf. FIGS. 3 and 4). In the bottom view (cf. FIG. 3) of the guide bush 20 the second contact sheet 40 ends with the edge of the guide bush 20. In the side view (cf. FIG. 4) of the guide bush 20 the second contact sheet 40 is adapted to the contour, especially the stepped contour of the guide bush 20. The full surface of the second contact sheet 40 is adjacent to the guide bush 20.

For electric coupling the second contact sheet 40 includes a terminal 44 projecting above the edge of the guide bush 20.

The first contact sheet 30 equally comprises a terminal 38. By the terminals 38, 44 the two contact sheets 30, 40 are electrically connected to the electric horn circuit. When the first contact sheet 30 is connected to the second contact sheet 40 by a joint contact, the electric horn circuit is closed and a horn signal is triggered.

The guide bush 20 includes two lateral retaining arms 23, 24. The lateral retaining arms 23, 24 are arranged to be opposed on both sides of the guide bush 20. The guide bush 20 is symmetrical in the bottom view (cf. FIG. 3).

The second contact sheet 40 is adjacent to the two retaining arms 23, 24. In this way safe and stable fixing of the second contact sheet 40 to the guide bush 20 is obtained. The second contact sheet 40 is connected to the guide bush 20 by pins 27 arranged at the guide bush 20. After attaching the second contact sheet 40 onto the guide bush 20 said pins 27 are melted on. The melted-on pins 27 are flattened on the side of the second contact sheet 40 facing away from the guide bush 20. Thus the pins 27 positively fix the second contact sheet 40 on the guide bush 20. The risk of damaging the second contact sheet 40 is reduced by this adaptation of the shape to the lateral profile 22 of the guide bush 20. The lateral retaining arms 23, 24 serve for the second contact sheet 40 connected thereto being made to contact a desired area of the first contact sheet 30 in a specified and advantageous manner.

Figure 3:
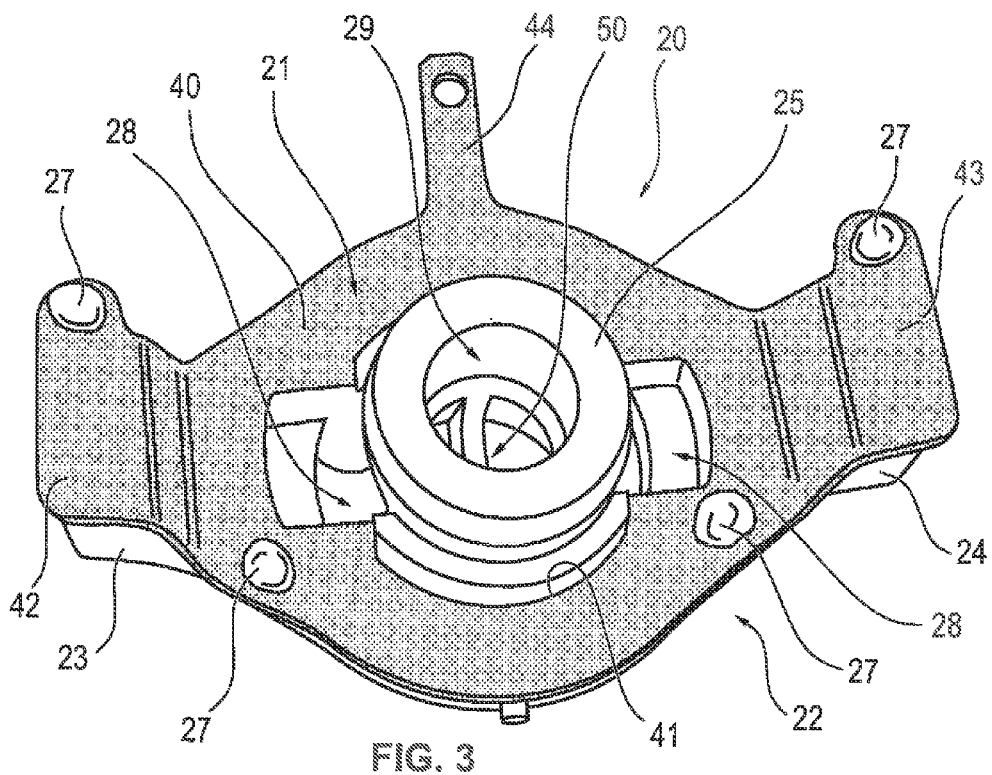
FIG. 3 is a bottom view of the guide bush according to FIG. 1.
Figure 4:
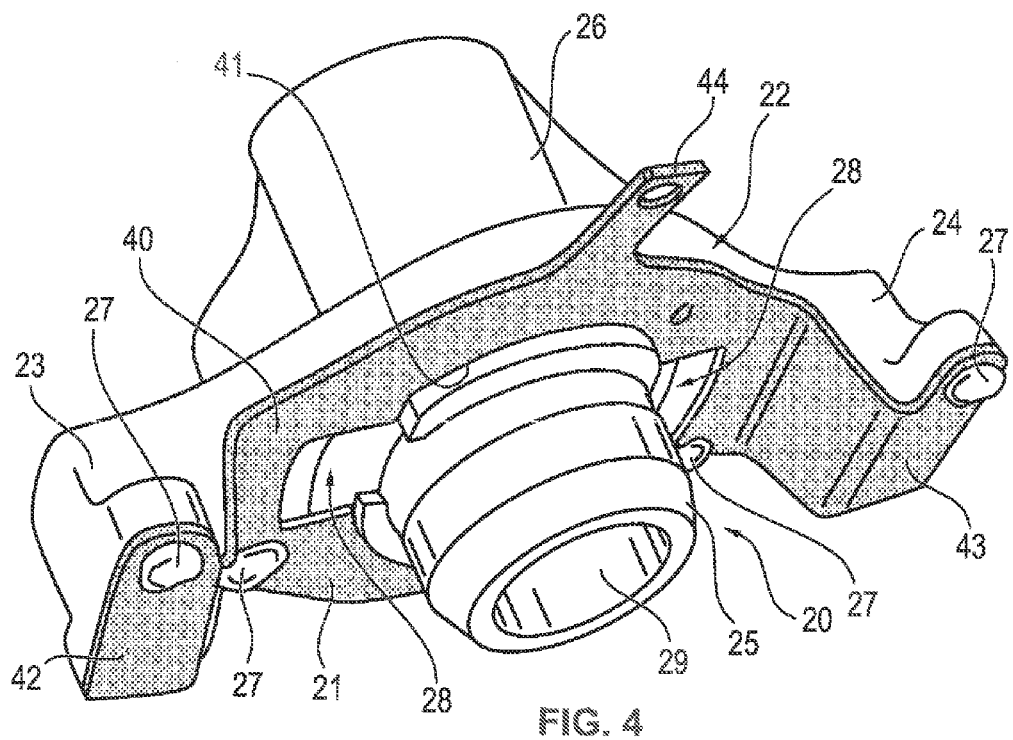
FIG. 4 is a side view of the guide bush according to FIG. 1.

The second contact sheet 40 includes two contact portions 42, 43 in the area of the two lateral retaining arms 23, 24, as illustrated in FIGS. 3 and 4. Each of the two contact portions 42, 43 forms an extension extending downwards in the mounting position. This results in a stepped profile of the second contact sheet 40 in the area of the contact portions 42, 43. The retaining arms 23, 24 are formed to be matching and are connected to the two extensions of the contact portions 42, 43. Hereby the distance of the second contact sheet 40 from the first contact sheet 30 is reduced in the idle position.

The guide bush 20 includes an upper bush portion 26 and a lower bush portion 25. The upper bush portion 26 is connected to the airbag module. The connection between the airbag module and the guide bush 20 is configured so that different airbag modules can be fastened to the upper bush portion 26 of the guide bush 20. Furthermore, the second contact sheet 40 includes a central recess 41 as shown in FIGS. 3 and 4. The lower bush portion 25 passes through said recess 41. The second contact sheet 40 completely encompasses the lower bush portion 25 in the shown embodiment. The recess 41 facilitates positioning of the second contact sheet 40 on the guide bush 20.

Between the upper bush portion 26 and the lower bush portion 25 the second contact sheet 40 is arranged. The lower bush portion 26 is accommodated by the click-stop element 11 and serves as guide.

In FIGS. 1 and 2 a first contact sheet 30 is illustrated which is arranged at the support element 11 in the area of the click-stop element 11 and has two arms 31, 32. The two arms 31, 32 are arranged in V shape to each other and partly enclose the click-stop element 11. Each of the two arms 31, 32 has a contact portion 33, 34 which makes the connection to the corresponding contact portion 42, 43 of the second contact sheet 40.

The two contact portions 33, 34 are electrically connected by a connecting element 35. The connecting element 35 is arranged between the two arms 31, 32. The two arms 31, 32 extend in V shape away from the connecting element 35 and end on each side of the click-stop element 11.

The two contact portions 33, 34 are arranged at the end of each of the arms 31, 32. The two contact portions 33, 34 are arranged to be opposed. The click-stop element 11 is disposed between the two contact portions 33, 34.

Moreover, each of the two contact portions 33, 34 of the first contact sheet 30 has an elevated contact point. The first contact sheet 30 is fixed in the foamed support element 10. The first contact sheet 30 is fixed to the support element 10 by impressing the first contact sheet 30 into the foam of the support element 10. The foam is pressed through small orifices 36 and is flattened on the upper side 37 of the first contact sheet 30. The upper side 37 corresponds to the side of the first contact sheet 30 facing away from the support element 10. After the foam is hardened, the first contact sheet 30 is positively connected to the support element 10. The foam hardened on the upper side 37 of the first contact sheet 30 forms a slight elevation projecting from the upper side 37 of the first contact sheet 30. In order to ensure that despite said material elevation a contact can be established between the second contact sheet 40 and the first contact sheet 30, the two contact portions 33, 34 of the first contact sheet 30 include a sufficiently elevated contact point projecting above all other material elevations.

The two contact portions 42, 43 of the second contact sheet 40 are made to contact the two contact portions 33, 34 of the first contact sheet 30 during the hooting operation. As soon as the first contact sheet 30 contacts the second contact sheet 40, the electric circuit between the two contact sheets 30, 40 is closed and the horn signal is triggered.

FIGS. 1 and 2 illustrate that the click-stop element 11 includes two stop tongues 12, 13. The two stop tongues 12, 13 extend upwards related to the support element 10 in their mounting position. The step tongues 12, 13 are engaged with the guide bush 20. FIG. 3 illustrates that the guide bush 20 comprises two seats 28 matching the two stop tongues 12, 13, the seats enabling the stop tongues 12, 13 to engage in the guide bush 20.

For the longitudinal movement the seats 28 are formed in the guide bush 20 as guides in which the stop tongues 12, 13 of the click-stop element 11 are arranged to be longitudinally movable. In this way the play between the guide bush 20 and the click-stop element 11 is obtained. Other connections having play are possible.

The seats 28 form breakthroughs extending in parallel to the longitudinal axis of the guide bush 20 so that the guide bush 20 is positively guided in the longitudinal direction. The seats 28 are formed in the retaining arms 23, 24. The shape of the breakthroughs and seats 28, resp., substantially corresponds to the shape of the stop tongues 12, 13.

The click-stop connection between the guide bush 20 and the click-stop element 11 includes an upper step defining the idle position of the guide bush 20. The stop is formed by an undercut of the stop tongue 12, 13 and a contacting edge of the guide bush 20 interacting with the undercut and restricting a longitudinal movement of the guide bush 20.

The play between the guide bush 20 and the click-stop element 11 is set so that in the hooting position a contact is established between the second contact sheet 40 and the first contact sheet 30.

The lower bush portion 25 is arranged between the stop tongues 12, 13, concretely speaking between lands of the stop tongues 12, 13, and is retained by the same. The click-stop element includes a recess which is formed coaxially with the lower bush portion 25. The recess can accommodate the lower bush portion 25.

The lower bush portion 25 has a cylindrical shape. Other shapes are Possible. The shape of the recess of the click-stop element is adapted to the shape of the lower bush portion 25.

In the inner area the guide bush 20 has a cylindrical recess 29 serving as seat holder and guide for the reset spring 50. The one end of the reset spring 50 acts on the guide bush 20. The reset spring 50 is laterally held and supported by the cylindrical recess 29 of the guide bush 20. The end of the reset spring 50 rests on the bottom of the cylindrical recess 29. The other end of the reset spring 50 acts on the click-stop element 11. This end of the reset spring 50 rests on the bottom of the cylindrical click-stop element 11. After the second contact sheet 40 and the first contact sheet 30 have been made to contact and hereby the horn signal has been triggered, the guide bush 20 is returned into its idle position by the resetting force of the reset spring 50. In order to save additional components within the steering wheel assembly, the guide bush 50 serves as holder for the reset spring 50.

FIGS. 1 and 2 illustrate a cutout of a steering wheal, especially a support element 10. In the shown embodiment the steering wheel is equipped with three click-stop elements 11 and three guide bushes 20. The three click-stop elements 11 are fastened on the support element 10 in triangular arrangement, in this manner, a precise orientation of the airbag module at the steering wheel is obtained. Each of the click-step elements 11 is embedded in the foam of the support element 10 or anchored in the foam of the support element 10, respectively. The support element 10 has a recess in the area of the module seat for the airbag module.

For actuating the horn the airbag module is forced downwards by the action of force. The guide bush 20 to which the airbag module is fastened is moved downwards relative to the click-stop element 11. As soon as the second contact sheet 40 contacts the first contact sheet 30 and in this way the electric connection is made between the first contact sheet 30 and the second contact sheet 40, the electric circuit is closed and the horn signal is triggered.

When the action of force on the airbag module is lifted, the reset spring 50 returns the guide bush 20 and thus the airbag module into its idle position again, whereby the contact between the first contact sheet 30 and the second contact sheet 40 is interrupted and the horn signal falls silent.

LIST OF REFERENCE NUMERALS

10 Support element
11 click-stop element
12 stop tongues
13 stop tongues
20 guide bush
21 underside
22 lateral profile
23 lateral retaining arm
24 lateral retaining arm
25 lower bush portion
26 upper bush portion
27 pins
28 seats
29 cylindrical recess
30 first contact sheet
31 arm
32 arm
33 contact portion
34 contact portion
35 connecting element
36 orifices
37 upper side
38 terminal
40 second contact sheet
41 recess
42 contact portion
43 contact portion
44 terminal
50 reset spring

The invention claimed is:

1. A steering wheel assembly comprising a support element (10) having at least one click-stop element (11) and at least one guide bush (20) for connection to an airbag module, wherein the guide bush (20) is connected to the click-stop element (11) by a click-stop connection such that the guide bush (20) is movable relative to the click-stop element (11) along the longitudinal axis of the guide bush (20) from an idle position into a hooting position and vice versa, wherein the support element (10) includes at least one first contact sheet (30) and the guide bush (20) includes at least one second contact sheet (40), the first contact sheet (30) being associated with the click-stop element (11) and being arranged in its mounting position beneath the guide bush (20) such that the second contact sheet (40) can be made to contact the first contact sheet (30) by the longitudinal movement of the guide bush (20).

2. The steering wheel assembly according to claim 1, wherein the second contact sheet (40) is connected to an underside (21) of the guide bush (20).

3. The steering wheel assembly according to claim 1, wherein the shape of the second contact sheet (40) is adapted to the shape of a lateral profile (22) of the guide bush (20).

4. The steering wheel assembly according to claim 1, wherein the guide bush (20) includes at least one lateral retaining arm (23), especially two lateral retaining arms (23, 24).

5. The steering wheel assembly according to claim 1, wherein the second contact sheet (40) includes at least one recess (41) through which a lower bush portion (25) of the guide bush (20) is passed.

6. The steering wheel assembly according to claim 1, wherein an upper bush portion (26) of the guide bush (20) can be connected to the airbag module and the second contact sheet (40) is arranged between the lower bush portion (25) and the upper bush portion (26).

7. The steering wheel assembly according to claim 1, wherein the first contact sheet (30) includes at least one arm (31, 32) having a contact portion (33, 34), especially at least two arms (31, 32) each having a contact portion (33, 34).

8. The steering wheel assembly according to claim 1, wherein the second contact sheet (40) includes at least one contact portion (42, 43), especially at least two contact portions (42, 43) which can be made to contact the at least two contact portions (33, 34) of the first contact sheet (30).

9. The steering wheel assembly according to claim 8, wherein each of the two contact portions (42, 43) of the second contact sheet (40) constitutes an extension extending downwards in the mounting position.

10. The steering wheel assembly according to claim 8 wherein the two contact portions (32, 33) of the first contact sheet (30) are electrically connected by a connecting element (35).

11. The steering wheel assembly according to claim 8, wherein each of the two contact portions (32, 33) of the first contact sheet (30) and/or of the second contact sheet (40) has at least one elevated contact point.

12. The steering wheel assembly according to claim 1, wherein the first contact sheet (30) at least partially surrounds the click-stop element (11).

13. The steering wheel assembly according to claim 1, wherein the click-stop element (11) includes at least one, especially two stop tongues (12, 13) which extend upwards in the mounting position and are engaged with the guide bush (20).

14. The steering wheel assembly according to claim 1, wherein a reset spring (50) acting, on the one hand, on the click-stop element (11) and, on the other hand, on the guide bush (20) is arranged in the guide bush (20).

15. A steering wheel comprising a steering wheel assembly according to claim 1.

16. A method of actuating a horn in which a force moving the guide bush (20) from the idle position into the hooting position is applied to a steering wheel according to claim 15, wherein the second contact sheet (40) is made to contact the first contact sheet (30) by the longitudinal movement of the guide bush (20).

\* \* \* \* \*